(12) United States Patent
Lermann

(10) Patent No.: US 10,161,806 B2
(45) Date of Patent: Dec. 25, 2018

(54) OUTLET HEAT DETECTOR

(71) Applicant: FireSmart Technology Inc., Staten Island, NY (US)

(72) Inventor: Jonathan Lermann, Staten Island, NY (US)

(73) Assignee: Firesmart Technology, Inc., Staten Island, NY (US)

( * ) Notice: Subject to any disclaimer, the term of this patent is extended or adjusted under 35 U.S.C. 154(b) by 205 days.

(21) Appl. No.: 15/262,775

(22) Filed: Sep. 12, 2016

(65) Prior Publication Data

US 2017/0077693 A1 Mar. 16, 2017

Related U.S. Application Data

(60) Provisional application No. 62/216,451, filed on Sep. 10, 2015.

(51) Int. Cl.
*G01K 1/12* (2006.01)
*G05B 15/02* (2006.01)
(Continued)

(52) U.S. Cl.
CPC .............. *G01K 1/12* (2013.01); *G05B 15/02* (2013.01); *H01R 13/7137* (2013.01);
(Continued)

(58) Field of Classification Search
CPC ....... G01K 1/12; G05B 15/02; H01R 13/7137
See application file for complete search history.

(56) References Cited

U.S. PATENT DOCUMENTS

| 3,522,595 A | 8/1970 | White |
| 3,737,835 A | 6/1973 | Clement et al. |
(Continued)

FOREIGN PATENT DOCUMENTS

| CA | 2759487 C | 10/2012 |
| CN | 2668350 Y | 1/2005 |
(Continued)

OTHER PUBLICATIONS

International Search Report for PCT Application No. PCT/US/16/51310, dated Jan. 19, 2017. 19 pages.
(Continued)

*Primary Examiner* — Scott Bauer
(74) *Attorney, Agent, or Firm* — Carter, DeLuca, Farrell & Schmidt, LLP

(57) ABSTRACT

A system and apparatus for sensing temperature to prevent electrical fires is provided for. Here, a device that plugs into a wall outlet, or attaches to the wall plate of a wall outlet, is equipped with an audible alarm and at least one temperature sensor, such that the device can sense the temperature of an appliance plugged into it, as well as the temperature of the electrical wires powering the wall outlet and the outlet receptacle. The device is capable of turning off the power to an appliance, as well as ejecting itself from the wall outlet entirely. It can be operated automatically or through a software application. Optionally, the apparatus is combined with a second device that connects to the main circuit panel of a house that is capable of stopping the flow of electricity to an entire house.

21 Claims, 8 Drawing Sheets

(51) Int. Cl.
*H01R 13/713* (2006.01)
*H01R 31/06* (2006.01)
*H02H 5/04* (2006.01)
*H01R 13/66* (2006.01)

(52) U.S. Cl.
CPC ............ *H01R 31/065* (2013.01); *H02H 5/04* (2013.01); *H01R 13/6683* (2013.01); *H01R 13/6691* (2013.01)

(56) References Cited

U.S. PATENT DOCUMENTS

| | | |
|---|---|---|
| 4,514,715 A | 4/1985 | Chen |
| 4,635,040 A | 1/1987 | Masot |
| 4,903,162 A | 2/1990 | Kopelman |
| 6,521,834 B1 | 2/2003 | Dykhoff et al. |
| 6,552,888 B2 | 4/2003 | Weinberger |
| 6,692,284 B1 | 2/2004 | Koh |
| 6,780,060 B1 | 8/2004 | Kajiura et al. |
| 7,808,760 B2 | 10/2010 | Kopelman |
| 8,143,520 B2 | 3/2012 | Cutler |
| 8,729,856 B2 | 5/2014 | Nathan et al. |
| 8,836,522 B2 | 9/2014 | Thorpe et al. |
| 8,956,168 B2 | 2/2015 | Al-Anzi |
| 2002/0043978 A1 | 4/2002 | McDonald |
| 2005/0168901 A1 | 8/2005 | Dayoub |
| 2009/0009353 A1 | 1/2009 | Schoettle |
| 2009/0224926 A1* | 9/2009 | Brusveen ................ G01K 1/14 340/595 |
| 2010/0277325 A1 | 11/2010 | Kopelman |
| 2012/0025972 A1 | 2/2012 | Boyden |
| 2012/0065923 A1* | 3/2012 | Whiteley ............... G01K 7/023 702/130 |
| 2013/0032594 A1 | 2/2013 | Smith |
| 2014/0054059 A1* | 2/2014 | Smith ................... H02G 3/081 174/66 |
| 2014/0133130 A1* | 5/2014 | Ebeling ............. H01R 13/5213 362/95 |

FOREIGN PATENT DOCUMENTS

| | | |
|---|---|---|
| CN | 2668350 Y | 1/2005 |
| CN | 102013598 A | 4/2011 |
| CN | 202308656 U | 7/2012 |
| WO | WO2011046265 A1 | 4/2011 |

OTHER PUBLICATIONS

English translation of CN102013598A.
English translation of CN202308656U.
English translation of WO2011046265A1.

* cited by examiner

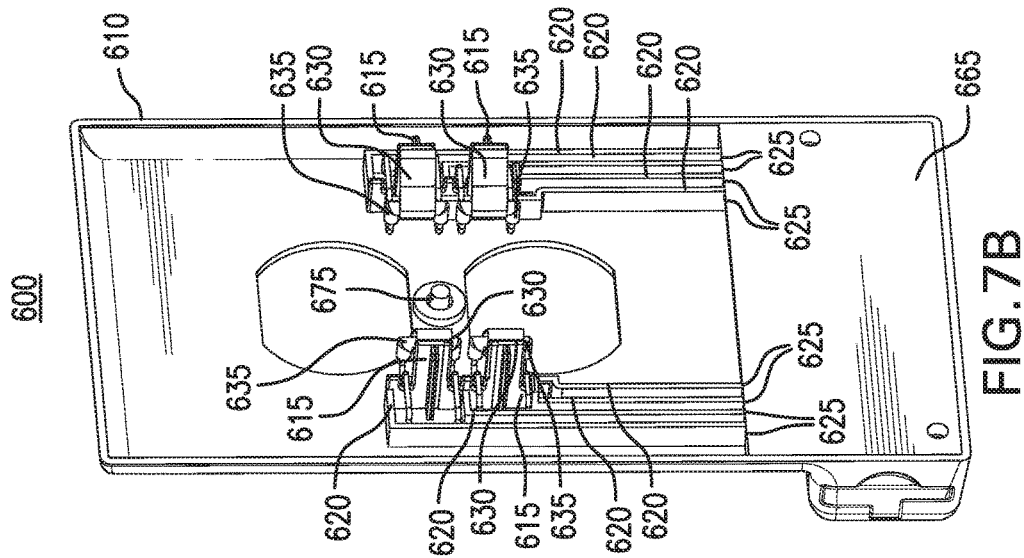
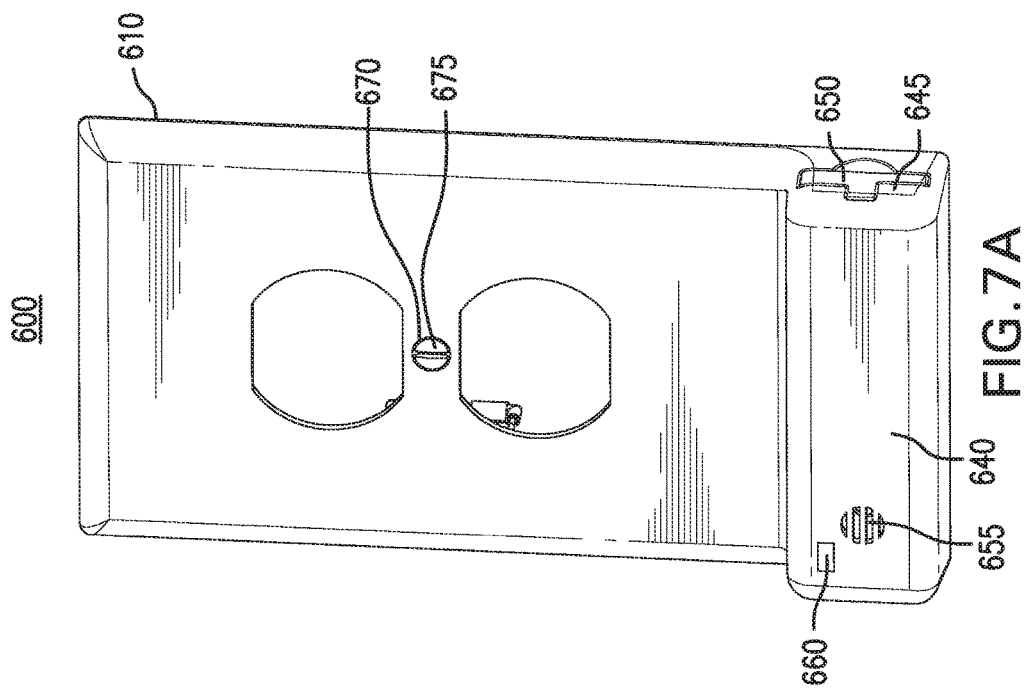

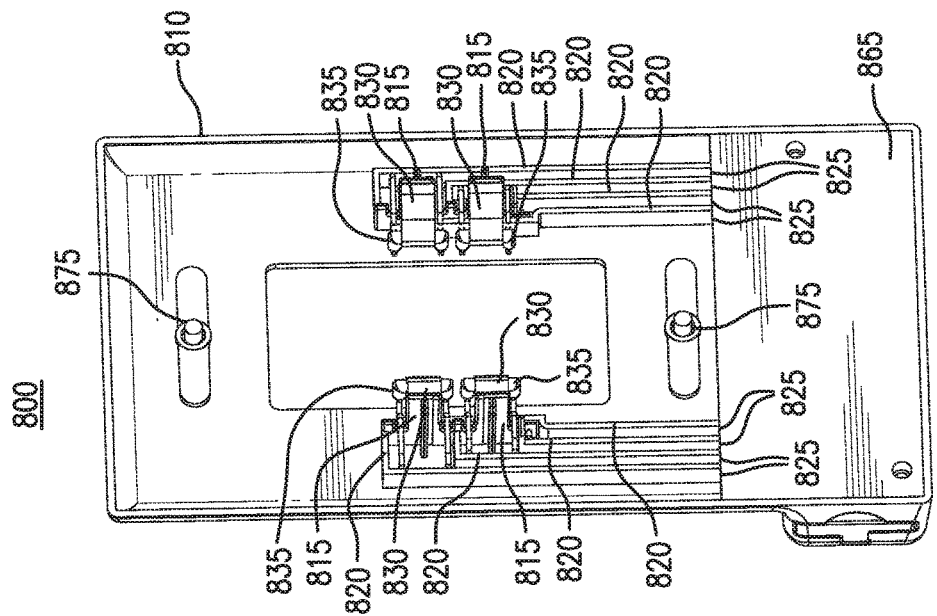
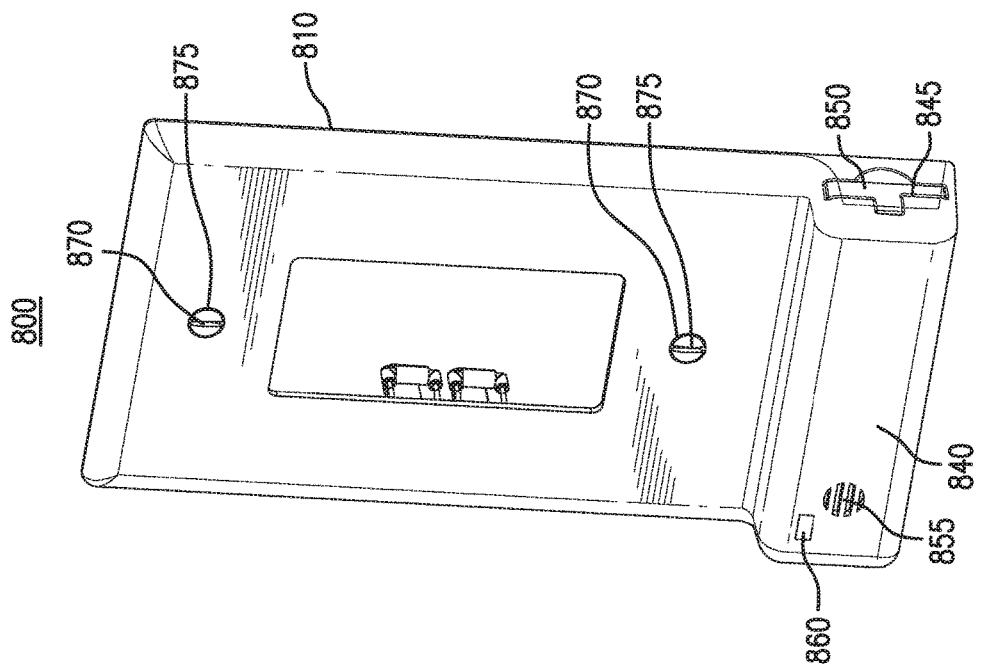

OUTLET HEAT DETECTOR

CLAIM OF PRIORITY

This utility patent application claims priority U.S. Provisional Application No. 62/216,451, filed on Sep. 10, 2015. The contents of this application are hereby incorporated by reference

FIELD OF THE EMBODIMENTS

The present invention and its embodiments relate to a system and apparatus for sensing temperature to prevent electrical fires. In particular, the present invention and its embodiments relate to a system and apparatus for sensing temperature to prevent fires caused by electricity.

BACKGROUND OF THE EMBODIMENTS

Today, a significant amount of fires in America are caused by electrical problems. According to the U.S. National Fire Protection Association, an estimated 47,700 home structure fires that were reported to U.S. fire departments involved some form of electrical failure or malfunction as a factor contributing to ignition. These fires cause an estimated $1.4 billion in property damage and loss, and are responsible for 418 deaths and 1,570 injuries, annually.

Each year in the United States, arcing faults are responsible for starting more than 28,000 home fires, killing and/or injuring hundreds of people and causing over $700 million in property damage. Electrical distribution systems are the third leading cause of home structure fires. The U.S. Consumer Product Safety Commission (CPSC) reports that electrical receptacles are involved in approximately 5,300 fires every year, causing approximately 40 deaths and more than 100 consumer injuries.

There are multiple issues prevalent in fighting these types of losses, such as the plurality of ways in which an electrical fire can occur, such as, e.g., a loose connection, which can occur over time. A loose wire connection will make for a bad connection and cause an unusual amount of heat buildup that can cause a fire. Loose wiring can also cause arcing within outlet receptacles, which can also result in fires. Additionally, a poor connection with a loose screw at a terminal increases heat at that location and can cause fires. A Ground Fault Circuit Interrupter (GFCI) or circuit breaker will not help reduce the chance of a fire in this case. Faulty extension cords and appliances that are plugged into the receptacle can also cause excessive power through the receptacle to have it overheat and can result in fires. Furthermore, an improper error in the wiring of an outlet receptacle can cause a fire. Overloaded and short circuits can also weaken and damage the outlet receptacle, which can lead to electrical fire. Also, over time, outlet covers can crack and can become loose on the wall. This, along with dust, which can accumulate on the receptacle, can cause fires. It is also noted that receptacles are made out of plastic and over time will break and crack and cause a serious hazard to anyone that touches it.

Once an electrical fire has ignited, multiple problems arise is dealing with such fires. Part of the problem in dealing with electrical fires is that few fire extinguishers are suitable for use against electrical fires. This is because, in an electrical fire, it is not the electricity itself that is burning but, rather, the objects around the source of electricity that are burning. This means that, even if the flames become extinguished, the fire will still continue to burn as long as the electricity is flowing. As such, standard procedure is to prevent the flow of electricity, and then to treat the fire as a normal combustion fire. However, in the heat of the moment, the clarity to turn off the source of electricity may be lost, or a firefighter may not realize that the source of the fire is electrical.

As such, there exists a need for a system and apparatus that is capable of automatically stopping the flow of electricity when an electrical fire has started or is about to start. Also, a there is a need for a device that has an audible alarm that can notify an individual, in his or her home or business, that there is an outlet receptacle that is operating outside of the normal temperature range that could potentially cause an electrical problem/fire.

The purpose of the present invention is prevention and, in particular, the prevention of electrical fires from occurring.

Review of related technology:

U.S. Pat. No. 3,737,835 pertains to a plug for insertion into an ordinary wall outlet and contains a mechanism for effecting self-ejection when the line cord is pulled laterally with respect to the plug. A line cord is attached to the plug and supported on a trigger member disposed to pivot about a vertical axis within the plug. The trigger member is normally biased to a central position by means of laterally disposed, oppositely acting compression springs bearing against a forwardly directed trigger arm. An ejecting member is biased in a forward direction to assume a normal attitude parallel to the plug prongs and extending slightly forwardly beyond the ends thereof. When the prongs are inserted into the wall socket, the ejecting member is pushed rearwardly and is cocked beneath a catch portion of the trigger arm when sufficient lateral force is exerted on the cord to pull the trigger arm to either side a predetermined minimum distance, the trigger arm releases the ejecting member which springs forward under the influence of its compression spring to forcibly eject the plug which may then be safely retrieved by manually pulling the line toward the operator.

U.S. Pat. No. 4,514,715 pertains to a safety receptacle having bimetallic means which will cut off the power line when an electrical appliance connected thereto is overloaded or short-circuited. Further, the safety receptacle may be slightly modified to form a circuit breaker or a safety plug.

U.S. Pat. No. 4,903,162 pertains to a receptacle having multiple electrical outlets includes in the main electrical inlet in electrical series with each of the electrical outlets, a heat-sensitive circuit-breaking element characterized as breaking of electrical circuit passed therethrough when the flow of current exceeds a predetermined amperage, as responsive to increased heat of resistance or other surrounding environmental heat, and as reestablishing circuitry when temperature has cooled-down to at-least a circuit-breaking temperature, there being preferably included in circuit with the circuit-breaking element a conventional electrical time delay element characterized by delaying reestablishing circuitry therethrough whenever circuitry has been broken, with a time delay of sufficient length to permit a cooling of circuitry to a point below circuit-breaking temperature of the circuit-breaking element, to prevent fire hazard from overheated old and/or inadequate house-wiring or insulation thereof.

U.S. Pat. No. 6,521,834 pertains to a fire stopping faceplate assembly for an electrical box includes a faceplate having an inner surface, and a fire stopping mat arranged adjacent said faceplate inner surface. The fire stopping mat provides an active system which forms a fire barrier capable of preventing a temperature rise on the wall side opposite the fire by providing an endothermic material which withdraws heat and/or by expanding to provide additional insulating properties and otherwise stopping the spread of fire. The fire stopping mat may include an intumescent compound, an endothermic compound, or both an intumescent compound and an endothermic compound. The fire stopping mat may also include a layer of an infrared blocking material formed of, for example, a metal or a ceramic fiber material.

U.S. Pat. No. 6,552,888 pertains to an electrical safety outlet for accepting a plug to provide power to electrical appliances including a power supply and an intelligent circuitry for controlling the power supply to the electrical outlet; the intelligent circuitry includes circuits for determining temperature condition in the outlet, mechanical plug insertion into the outlet, load presence on the outlet, and current capacity conditions.

U.S. Pat. No. 6,780,060 pertains to a card connector system that detachably supports a PC card and electrically connects the PC card to an electrical device. The system includes a temperature sensor to monitor temperature of the PC card to prevent the deleterious effect of heat generated by the PC card on the PC card itself and the electrical device. The sensor detects the surface temperature of the supported PC card and transmits the obtained temperature information to the electrical device. In this case, it is preferable that a transition board 33, electrically connected between the PC card and the electrical device, is used to transmit the temperature information.

U.S. Pat. No. 7,808,760 pertains to an electrical device including a heat sensing circuit interrupter to enable a load to be selectively coupled to or disconnected from a power source in accordance with a level of a sensed temperature includes a relay assembly operable between a closed state when the sensed temperature is below a predetermined limit temperature, thereby enabling the coupling of the load to the power source, and an open state when the sensed temperature is above the predetermined limit temperature, thereby electrically disconnecting the load from the power source. The device further includes a sensor assembly including a light source operatively associated with a light sensor. The light sensor is configured to be sensitive to specific levels of the sensed temperature and the light source is configured to emit light along a plurality of optical paths at any one of a plurality of wavelengths sensitive to temperature. The light sensor is further configured to sense temperature at any one of a plurality of operating points on the electrical device and trigger the relay assembly between the closed state and the open state.

U.S. Pat. No. 8,143,520 pertains to a light switch cover assembly easily mounted over existing wall type light switches. The cover assembly includes a mounting bracket having an opening provided therethrough which is shapely designed and sizably configured for snug attachment of a bracket plate therein. The bracket plate includes an opening to allow the protruding rocker portion of a light switch to pass therethrough. The bracket plate further includes a plurality of apertures defined therethrough for receipt of mounting screws. A face plate is adapted for removable attachment to the mounting bracket in a snap-fit manner. The face plate includes an opening shapely designed and sizably configured to snugly accommodate a rocker plate therein. The face plate further includes an oblong opening providing a thermometer support enclosure within which a thermometer is swivably secured.

U.S. Pat. No. 8,729,856 pertains to a system and method operable to facilitate thermal wall plug sensing and control may include an ability to control current drawn by a charging system or other load according to a temperature determined at an interface between the charging system and an energy source used to provided energy to the charging system. A temperature sensed with a temperature sensor included in a plug assembly or other housing or cord used to connect the charging system to the energy source may be used to implement the temperature regulated current control.

U.S. Pat. No. 8,956,168 pertains to an electrical outlet safety device is placed between an electrical plug and the corresponding electrical outlet or receptacle to which the plug is connected. The safety device includes a thin body portion formed of a material adapted to expand rapidly if exposed to a predetermined temperature. A series of thin, electrically and thermally conductive blades extends from the body, with the blades being captured between the prongs of the plug and the internal contacts of the receptacle when installed therewith. If excessively high electrical resistance and correspondingly high temperature are produced in one or more of the electrical connections between the plug and the outlet, the blades of the safety device transmit the excessive temperature to the body, whereupon the body is transformed to an expansive electrically insulating foam that expels the plug from the receptacle. Springs may be included within the body to provide additional expansive force.

U.S. Pat. No. 8,912,442 pertains to a cover plate for an electrical receptacle. The cover plate includes a first conducting strip. The first conducting strip protrudes rearward from the cover plate and is configured to contact a first terminal of a receptacle, where the first terminal connects the receptacle to a power source. The cover plate also includes a first insulating means, where the first insulating means prevents the first conducting strip from contacting other conducting materials. The cover plate further includes a second conducting strip. The second conducting strip protrudes rearward from the cover plate and is configured to contact a second terminal of the receptacle, where the second terminal completes the connection of the receptacle to the power source. The cover plate additionally includes a second insulating means, where the second insulating means prevents the second conducting strip from contacting other conducting materials. The cover plate also includes a load.

U.S. Patent Publication No.: 20020043978 pertains to a visual indicator notifies an occupant of an unsafe wiring condition in an electrical outlet or switch. The visual indicator and the electrical conductors inside the outlet being thermally connected, but electrically separated. When a threshold temperature is reached which is outside the normal operating temperature of an electrical outlet, the visual indicator will change state to notify occupants of a wiring problem.

International Patent Application No.: WO2011046265 pertains to a power-saving intelligent plug socket for fire prevention, and more specifically, to a power-saving intelligent plug socket for fire prevention which can prevent the malfunction of electric equipment by cutting off the power supplied to the electric equipment if the temperature is high inside or outside the plug socket, or there is an over current, short circuit, or over voltage. Further, the invention prevents electrical accidents and fires which may break out as a result of electrical accidents, reduces power loss by cutting off the wait current, enables the status of the plug socket to be easily confirmed by visually displaying the inside and outside temperatures and the current values flowing through the plug socket, and minimizes power consumption of a power conversion means for self control.

Canadian Patent No.: CA2759487 pertains to an apparatus that com-bine and analyze electronic signals from Hall Effect sensors, current transformer, Pyroelectric infrared sensor, ionization chamber smoke sensor, to determine the imminence of fire hazard. On determination of the imminence of fire 'Firevoider' turns OFF the power to the range after pausing and sounding an alarm long enough to allow the cook to intervene. The various electronic circuitries are provided with stored charge powers back up to retain memory during power failures. In addition to the above features 'Firevoider' has a 'Timer Mode Cooking' feature that can automate cooking and save up to 40% power. 'Firevoider' does not interfere with cooking if the situation is safe or the cooking is attended. The apparatus for carrying out the various functions include, a smoke sensor to measure smoke level, a motion sensor that detects horizontal motion in the near vicinity of the range, a Hall sensor that measures power consumption by stove(s), a current transformer that determines the lower cut off level of power consumption by the range, a solid state relay to control power supply to the range, electronic circuitry to process signals, a set of two piezoelectric alarms to alarm the hazard status and indicate actions, a set of LED lamps to indicate various situations and status and suitable enclosure to accommodate the circuitry and sensing elements spread over four locations.

Chinese Patent No.: CN2668350 pertains to an electric shaver capable of ejecting charging plug, comprising a casing, a shaver head, a motor, a battery, and a circuit board. The utility model is characterized in that the inner wall of the casing is provided with a rotary support frame; the rotary support frame is provided with a rotating shaft; the rotating shaft is provided with a torsion spring and a plug piece; the casing is provided with a depressed plug socket; the plug socket is provided with a via hole; the plug piece inserts into the plug barn through the via hole; the rotating shaft is provided with a convex fixed buckle; the other inner wall of the casing opposite to the rotary support frame is provided with a convex fixed shaft; the fixed shaft is provided with two clamps; the handles of the two clamps extend to the communicating holes on the side face of the casing; the two clamps are provided with a spring in between; the jaws formed by the two clamps correspond with the convex fixing buckle on the rotating shaft; the circuit board is provided with a contact piece corresponding with the plug piece. The utility model can automatically eject the plug inlayed in the narrow slit and is convenient to use.

Chinese Patent Publication No.: CN102013598 pertains to a socket capable of automatically popping up a plug. The socket comprises a shell and at least two conducting holes arranged on the shell, wherein, conducting strips are respectively arranged in at least two conducting holes and are electrically connected with the plug. The socket further comprises a popup mechanism arranged in the shell, and a sensor fixedly connected on the popup mechanism, wherein, the sensor is used for sensing the current change state on the plug, and the popup mechanism is used for automatically popping up the plug from the socket when the sensor senses that the current state on the plug is changed into a no-current state. By adopting the socket capable of automatically popping up the plug, a plurality of hidden dangers caused by the plugged plug can be avoided.

Chinese Patent No.: CN202308656 pertains to a power supply socket for preventing electric appliance fire hazards. A socket box is provided with a mechanical type pressure switch, a pressure switch normally opened contact is connected in parallel between an AC power supply live wire and a live wire jack, one end of a polymer flexible pipe is connected with a pressure switch control mouth, the other end is connected with an inflation non-return valve, the polymer flexible pipe is arranged inside an electric appliance and filled with extinguishing chemical and pressurizing gas for fighting electric appliance fire hazards, and the flexible pipe or the non-return valve is connected with a gas-pressure meter. When the temperature of a certain fire hazard dangerous source inside the electric appliance reaches the softening and explosion temperature of the adjacent polymer flexible pipe, the extinguishing chemical inside the flexible pipe will spray out and effectively cover the dangerous source, thus abnormal temperature rise inside the electric appliance can be reduced, and initial fire hazards can be put out rapidly. At the same time, control pressure of the pressure switch is lost, the contact is broken immediately and a main power supply is cut off. In the power supply socket, fire hazard detection, fire extinguishing and power supply interruption are integrated, and fire hazard detection is timely and reliable and fire extinguishing is rapid and accurate.

Various devices are known in the art. However, their structure and means of operation are substantially different from the present invention. Such devices fail to provide a device that can help develop a participant's knowledge in a multitude of different subject areas, while simultaneously engaging the participant physically. At least one embodiment of this invention is presented in the drawings below, and will be described in more detail herein.

SUMMARY OF THE EMBODIMENTS

The present invention provides for a temperature-sensing apparatus, comprising: at least one electrical plug outlet; at least one electrical plug inlet; an outer shell enveloping said at least one electrical plug inlet; an electrical line interface, housed inside said outer shell; a heat sensor housed inside said outer shell; a memory housed inside said outer shell; a processor housed inside said outer shell; and a wireless transceiver housed inside said outer shell. In some embodiments, the apparatus further comprises a light sensor which is disposed on said outer shell. Alternatively, the present invention can be equipped with a smoke or carbon monoxide detector.

The present invention further provides for at least one temperature-sensing apparatus, comprising: a wall plate configured to house at least one electrical outlet; at least one flexible contact plate configured to power the apparatus by coming into contact with at least one of a plurality of electrical outlet terminal screws of an outlet receptacle; an electrical line interface housed inside the wall plate; at least one heat sensor, housed inside the wall plate, each of the at least one heat sensors being in contact with one of the plurality of electrical outlet terminal screws; a speaker; and at least one Light Emitting Diode. In a preferred embodiment, the temperature sensing apparatus further includes a battery supply housed inside the wall plate.

In a preferred embodiment, the present invention is equipped with a battery and/or an indicator light. In yet another embodiment, the heat sensor of the present invention is capable of independently or simultaneously measuring the temperature of the present invention, the outlet receptacle, an appliance plugged into the present invention, as well as the electrical wires leading up the outlet upon which the present invention is plugged into or attached to the wall plate. The present invention is capable of powering down an attached appliance or ejecting itself from the wall when a predetermined temperature is reached. Frequently the insulation of electrical wires will begin to fail at 194° F., and outlet receptacles fail at approximately 60°-75° C., so, in many embodiments, the predetermined temperature will be at or below that temperature.

In yet another embodiment, the present invention will send a notification to a user, via the included wireless transceiver, through the Internet. This notification can be sent to a local response team, or can contain information regarding the applicant plugged into the apparatus of the present invention. The outer shell is preferably constructed out of plastic, rubber, or some combination thereof. Further, the electrical outlet plug may be retractable, or the apparatus of the present invention may use a push-off bar to remove itself from a wall outlet.

The apparatus of the present invention may also include at least one speaker, allowing the apparatus to make a noise once the heat sensor measures a predetermined temperature. These noises can also correspond to a particular event. Additionally, the apparatus of the present invention is capable of toggling the power of any appliance attached thereto.

In another embodiment, the apparatus is combined with an add-on device that attached to the main electrical panel of a house, such that the entire flow of electricity can be shut off to a house, if necessary. Further, the apparatus/add-on combination will be mediated by a software application, preferably a software application optimized for a smartphone, tablet, or similar device.

This software application will be capable of notifying a user of an increase in temperature that may be due to a faulty wire, power surge, old wires touching, a faulty appliance, or any other circumstances that could possibly cause a fire. The application also allows the homeowner to name each apparatus and list the appliances plugged in. The user can take pictures of the appliances, or search from a preexisting database. By doing this, the homeowner will be able to turn the apparatus on and off, managing the power supply to any appliance that is plugged into the invention.

This also helps in protecting any appliance that the invention has plugged into it by removing itself from the outlet.

It is an object of the present invention to provide a device that will help prevent electrical fires.

It is an object of the present invention to limit the amount of electrical fires in the world today.

It is an object of the present invention to provide a means to remotely control an appliance via the internet.

It is an object of the present invention to provide a comprehensive system that will enable whole-home protection against electrical fires.

It is an object of the present invention to provide a software application that manages an in-home electrical fire prevention system.

It is an object of the present invention to provide a means to protect appliances from electrical fires.

BRIEF DESCRIPTION OF THE DRAWINGS

FIGS. 7A and 7B show a front (7A) and rear (7B) perspective view of an embodiment of the temperature sensing apparatus of the present invention.

FIG. 9 shows a front (9A) and rear (9B) perspective view of an embodiment of the temperature sensing apparatus of the present invention.

DESCRIPTION OF THE PREFERRED EMBODIMENTS

Figure 1:
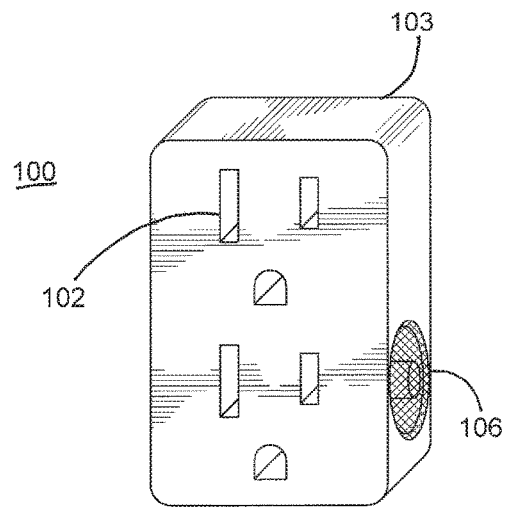
FIG. 1 shows a front perspective view of an embodiment of the temperature sensing apparatus of the present invention.

The preferred embodiments of the present invention will now be described with reference to the drawings. Identical elements in the various figures are identified with the same reference numerals.

In various embodiments of the present invention, reference is made to three main types of outlet covers for which the invention will coincide. One is a 1-Gang Decora wall plate/faceplate. The second is a 1-Gang Duplex Outlet Receptacle wall plate/faceplate. The third is a Ground Fault Circuit Interrupter (GFCI) wall plate. The type of outlet cover a consumer decides to use often depends on the type of outlet cover he/she already has on the consumer's current receptacle(s). According to an embodiment of the present invention, an apparatus is provides which monitors the temperature of the receptacle by touching the four terminal connection points of the outlet receptacle. The heat sensor monitors the receptacle to make sure that the receptacle does not operate outside of its normal operating range.

Most receptacles are rated from 60° to 75° C. According to an embodiment of the present invention, the apparatus works on 15-amp, 20-amp, and 120-volt circuit receptacles. According to an embodiment, the apparatus also work on a GFCI, Arc Fault Receptacle (AFCI), Tamper-resistant receptacle, and 1-10 gang duplex outlets. According to an embodiment, the apparatus includes a smoke and carbon monoxide add-on feature that has the ability to wirelessly notify the owner if the receptacle's alarm is going off due to an increase in temperature in the device through text message, automated phone call, or email, provided that the consumer is not in the nearby vicinity of the receptacle. According to embodiments, the apparatus can come in multiple colors depending on the current color of the consumer's receptacle(s) or personal preference. Also, according to embodiments, the device can be made out of many different types of materials (such as, e.g., wood, plastic, metal, etc.), depending on the consumer's current type of outlet cover and/or personal preferences.

According to various embodiments of the present invention, the invention monitors an electrical temperature traveling through an outlet receptacle and electrical box. If the temperature inside the outlet receptacle reaches or exceeds a temperature of approximately 60° to 70° Celsius, an alarm will activate. According to an embodiment, the alarm will activate a pulsating alarm every 1 second at 85 decibels from a distance of 3 meters at a sound frequency of 3,000 Hz. In an embodiment, the alarm may meet NFPA 72, NFPA101 (One and two family dwellings) Federal Housing Authority (FHA), and Housing and Urban Development (HUD) requirements. According to an embodiment, when the alarm activates, a very small LED light that notifies the user that device is working will change from a consistent blinking green to a steady red to notify the user it has been activated. According to an embodiment, there is a reset button configured to reset the alarm after activation occurs. According to an embodiment, to reset the alarm, the reset button is pressed and held down until the alarm stops and the LED light changes color back to a blinking green light.

According to an embodiment, when the battery is low, the green blinking LED light will turn to a blinking yellow, and a low battery chirp alarm will go off at 85 decibels from 3 meters at a sound frequency of 3,000 Hz. for every 45 seconds for 7 days consecutively. According to an embodiment, the device has a test button/reset button on it. To check if the device is working properly, the test button/reset button is held down for 3 seconds until the device is activated. According to an embodiment, to inactivate the alarm, the reset/test button is pressed and held for 3 seconds, until the alarm stops and goes back to its normal mode.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring to FIG. 1, temperature-sensing apparatus 100 is provided for. Here, apparatus 100 shows at least one electrical plug inlet 102, outer shell 103, and at least one speaker 106.

In a preferred embodiment, the outer shell of the apparatus will be constructed out of durable plastic and/or rubber. These materials allow the device to pop off or retract from the wall and land on the ground without causing any damage to the apparatus. Preferable, the apparatus will be constructed such that it is shock proof. Additionally, there may be multiple types of sensors in the main body of the invention. These sensors will be selected from the group consisting of heat, light, smoke, and carbon monoxide detectors. Optionally, there will be a small speaker to alarm the homeowner of a problem.

In an another embodiment, the apparatus of the present invention contains a battery to be used as a backup power supply, should the apparatus lose power upon popping off the wall and/or due to faulty wiring in the house. The apparatus contains various microchips, such as, but not limited to processors, RAM, at least one wireless transceiver, and non-volatile storage. Preferably, there will also be a small indicator light that will to notify the homeowner that the device is working properly. When the light changes to a designated color, the owner will know the invention is not working properly.

Figure 2:
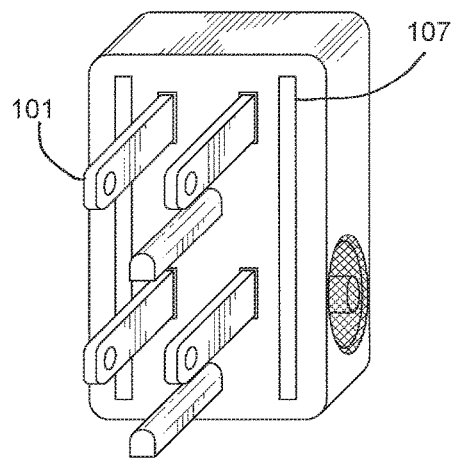
FIG. 2 shows a rear perspective view of an embodiment of the temperature sensing apparatus of the present invention.

Referring to FIG. 2, a rear perspective view of the embodiment shown in FIG. 1 is provided for. Here, at least one electrical plug outlet 101, and at least one push off bar 107 are shown. At least one push off bar 107 is used to disengage the apparatus from a wall outlet when a given temperature is detected by the apparatus.

Figure 3:
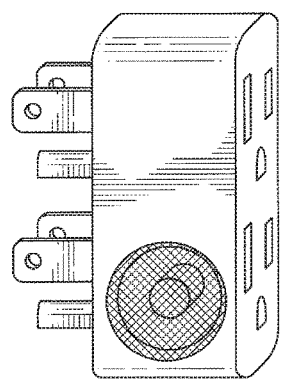
FIG. 3 shows a right perspective view of an embodiment of the temperature sensing apparatus of the present invention.
Figure 4:
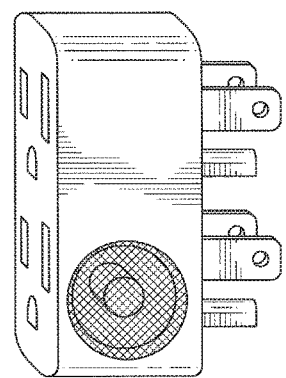
FIG. 4 shows a left perspective view of an embodiment of the temperature sensing apparatus of the present invention.

FIGS. 3 and 4 show left and right side views of the embodiment pictures in FIGS. 1 and 2.

Figure 5:
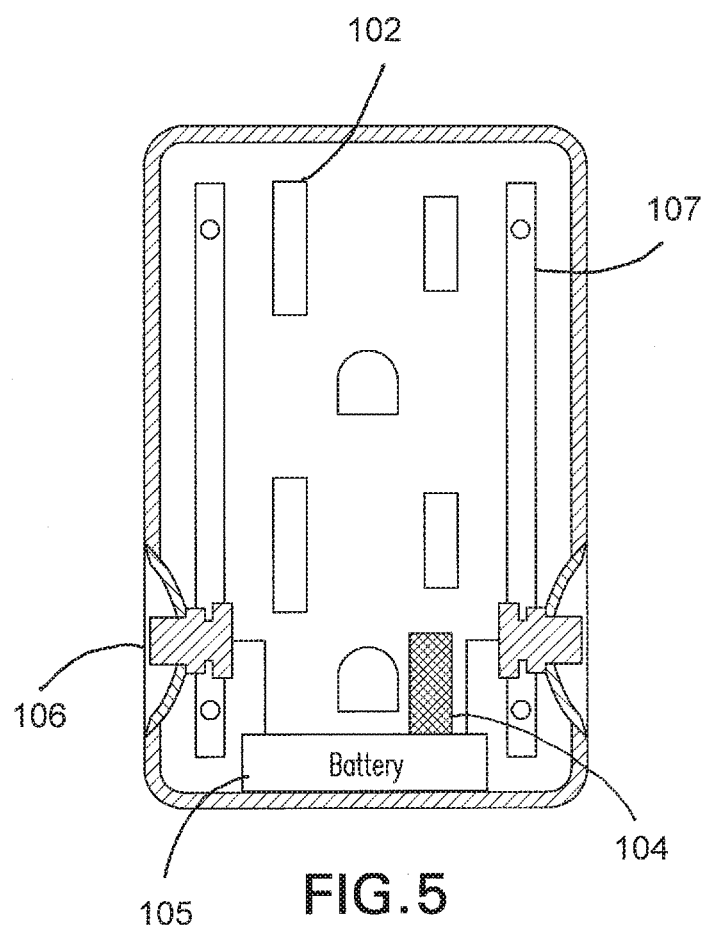
FIG. 5 shows a cross-sectional view of the internal components of an embodiment of the temperature sensing apparatus of the present invention.

Referring to FIG. 5, a cross sectional view of an embodiment of the temperature-sensing apparatus of the present invention is shown. Here, at least one electrical plug inlet 102, power source 105, heat sensor 104, at least one speaker 106, and at least one push off bar 107 are shown. Various types of heat sensors are appropriate for use with the present invention. These sensors can be any type of sensor that detects heat, such as, but not limited to thermocouples, junction semiconductor sensors, resistive temperature devices, infrared sensors, bimetallic devices, thermometers, change-of-state sensors, and/or a silicon diode. These sensors monitor the temperature of: the wires that connect to the outlet, the outlet box, and the plugs of any appliance that plug into the invention. The invention will make sure the maximum rated temperature of the wire-insulation materials (typically 194 degrees Fahrenheit), and an outlet receptacle (typically 60 to 75 degrees Celsius), does not get reached using the early detection from the heat sensors.

The apparatus of the present invention has the ability to eject itself off of the wall outlet that it is plugged into by a push bar, springs, simple level, fulcrum, threaded screw, actuator, or any method that could be used to exert force against a wall such that the device is able to unplug itself. Alternatively, the apparatus of the present invention will be able to retract the metal prongs that go inside the outlet plug holes so that the device can come off the wall. All of these methods are used when the invention notices an increase in temperature outside the normal range of operation of a 110 volt and/or 220 volt electrical line. When the device notices an increase in temperature, it will send a signal to have the apparatus remove itself from the wall plug, while emitting an audible alarm.

In this scenario, the temperature sensors will trigger the sending of a message to the mobile application. This message will notify the mobile application's owner that there is a possible fire due to an increase in temperature outside near the apparatus. The message will indicate the location of the invention and what appliance is plugged into it, if available. The mobile application will also provide the option of sending a message to the alarm company. In alternative embodiments, this notification is sent automatically. This message will state the location of the invention and the type of alarm going off in order to have the corresponding resources to respond quickly and appropriately.

Figure 6:
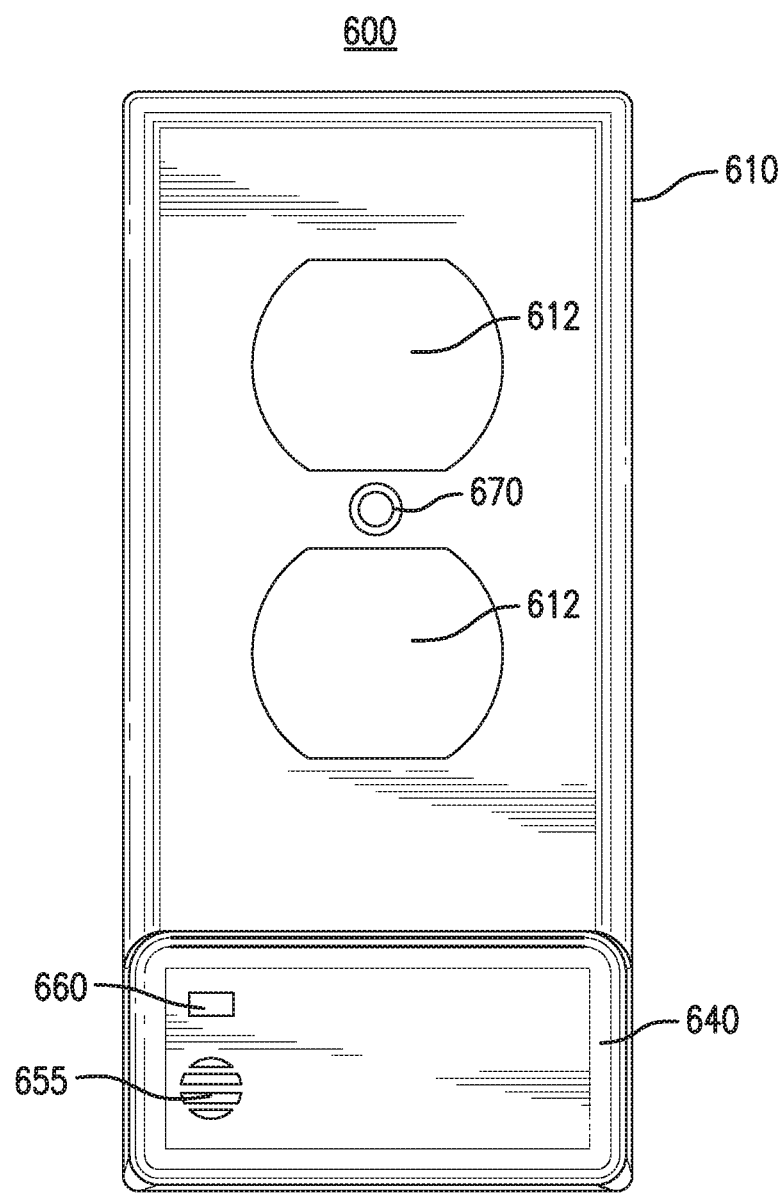
FIG. 6 shows a front perspective view of an embodiment of the temperature sensing apparatus of the present invention.

Referring to FIG. 6, a temperature-sensing apparatus 600 is provided for, having a front view.

In a preferred embodiment, the apparatus 600 has an outer shell consisting of a Gang Duplex wall plate 610. The wall plate 610 has at least one opening 612 for housing one or more electrical outlets. The wall plate 610 preferably includes thermoplastic nylon. However, other materials may also be used.

The wall plate 610 includes at least one hole 670 into which a screw can be inserted, and further includes a base portion 640. The base 640 of the apparatus 600 includes a speaker 655, LED 660, battery 645, wiring, a Printed Circuit Board assembly (PCBA), and other electronics.

Referring to FIGS. 7A and 7B, front (7A) and rear (7B) views of apparatus 600 are provided for.

In a preferred embodiment, the apparatus 600 has an outer shell consisting of a Gang Duplex wall plate 610. The wall plate 610 preferably includes thermoplastic nylon. However, other materials may also be used.

In an embodiment, a thin thermoplastic nylon shield 615 is attached to the wall plate 610. This shield 615 is designed to prevent any wires inside an electrical plug outlet from coming into contact with, and interfering with, the heat sensor 635. The shield 615 also prevents the wires in the outlet receptacle from touching the outlet box.

In an embodiment, a small thin thermoplastic nylon shield 620 is attached to the wall plate 610. This shield 620 aids in the protection of the wires from the heat sensor 630 to the Printed Circuit Board Assembly (PCBA). Furthermore, in an embodiment, a small multifunctional wire 625 is used to gain power from the terminal of the outlet receptacle to power the apparatus 600 and to send signals from the heat sensor 635 to the PCBA.

Additionally, in an embodiment, one or more contact plates 630, which includes an angled and flexible piece of metal, is used to touch the outlet receptacle terminal in order for the apparatus 600 to gain power from the terminal to the power device 600. The contact plates 630 are further used to monitor temperature of the receptacle. According to an embodiment, the contact plate 630 comes into contact with at least one terminal screw in the wall plate 610.

The base 640 of the apparatus 600 includes a speaker 655, LED 660, battery 645, wiring, PCBA, and other electronics. The base 640 further includes a backup battery 645 designed to supply power to the apparatus 600 in the event that there is a power outage, in case the outlet receptacle fails due to fire, loose wire(s) to the terminal and/or the receptacle, and/or in case of any other potential problem that could cause a loss in power to the receptacle.

The backup battery 645 is able to slide in and out of the battery holder 650 on a plastic track using a push-push system wherein a user pushes in once to pop out the track used to insert the battery 645, and then pushes in a second time to have the battery 645 and track retract back into the apparatus 600.

The apparatus 600 further includes a rear cover 665, to protect all of the electrical components, and a hole 670 through which a screw 675 attaches to the receptacle.

Figure 8:
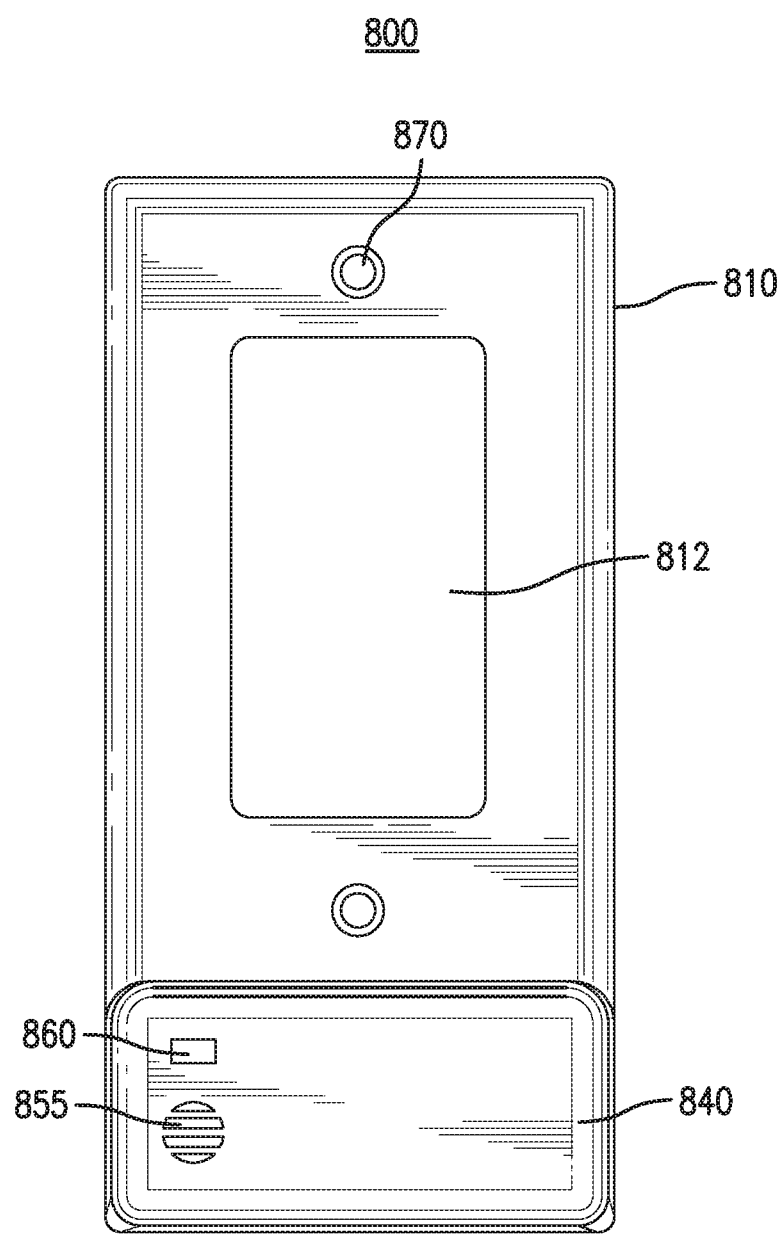
FIG. 8 shows a front perspective view of an embodiment of the temperature sensing apparatus of the present invention.

Referring to FIG. 8, a temperature-sensing apparatus 800 is provided for, having a front view.

In a preferred embodiment, the apparatus 800 has an outer shell consisting of a rectangular wall plate (Decora wall plate) 810. The wall plate 810 has at least one opening 812 for housing one or more electrical outlets. The wall plate 810 preferably includes thermoplastic nylon. However, other materials may also be used.

The wall plate 810 includes at least one hole 870 into which a screw can be inserted, and further includes a base portion 840. The base 840 of the apparatus 800 includes a speaker 855, LED 860, battery 845, wiring, a PCBA, and other electronics.

Referring to FIGS. 9A and 9B, front (9A) and rear (9B) views of apparatus 800 are provided for.

In a preferred embodiment, the apparatus 800 has an outer shell consisting of a rectangular wall plate 810. The wall plate 810 preferably includes thermoplastic nylon. However, other materials may also be used.

In an embodiment, a thin thermoplastic nylon shield 815 is attached to the wall plate 810. This shield 815 is designed to prevent any wires inside an electrical plug outlet from coming into contact with, and interfering with, the heat sensor 835. The shield 815 also prevents the wires in the outlet receptacle from touching the outlet box.

In an embodiment, a small thin thermoplastic nylon shield 820 is attached to the wall plate 810. This shield 820 aids in the protection of the wires from the heat sensor 830 to the Printed Circuit Board Assembly (PCBA). Furthermore, in an embodiment, a small multifunctional wire 825 is used to gain power from the terminal of the outlet receptacle to power the apparatus 800 and to send signals from the heat sensor 835 to the PCBA.

Additionally, in an embodiment, one or more contact plates 830, which includes an angled and flexible piece of metal, is used to touch the outlet receptacle terminal in order for the apparatus 800 to gain power from the terminal to power the apparatus 800. The contact plates 830 are further used to monitor temperature of the receptacle. According to an embodiment, the contact plate 830 comes into contact with at least one terminal screw in the wall plate 810.

The base 840 of the apparatus 800 includes a speaker 855, LED 860, battery 845, wiring, PCBA, and other electronics. The base 840 further includes a backup battery 845 designed to supply power to the apparatus 800 in the event that there is a power outage, in case the outlet receptacle fails due to fire, loose wire(s) to the terminal and/or the receptacle, and/or in case of any other potential problem that could cause a loss in power to the receptacle.

The backup battery 845 is able to slide in and out of the battery holder 850 on a plastic track using a push-push system wherein a user pushes in once to pop out the track used to insert the battery 845, and then pushes in a second time to have the battery 845 and track retract back into the apparatus 800.

The apparatus 800 further includes a rear cover 865, to protect all of the electrical components, and a hole 870 through which a screw 875 attaches to the receptacle.

Figure 10:
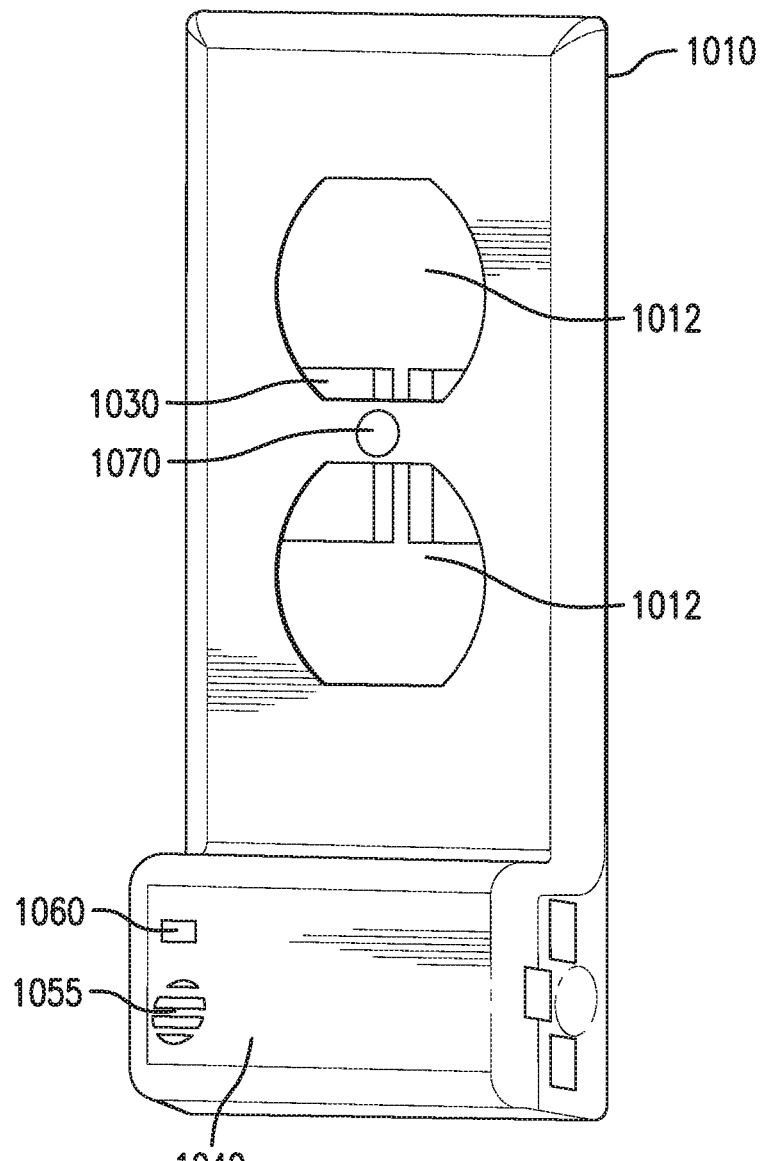
FIG. 10 shows a front perspective view of an electrical panel used with an embodiment of the temperature sensing apparatus of the present invention.
Figure 11:
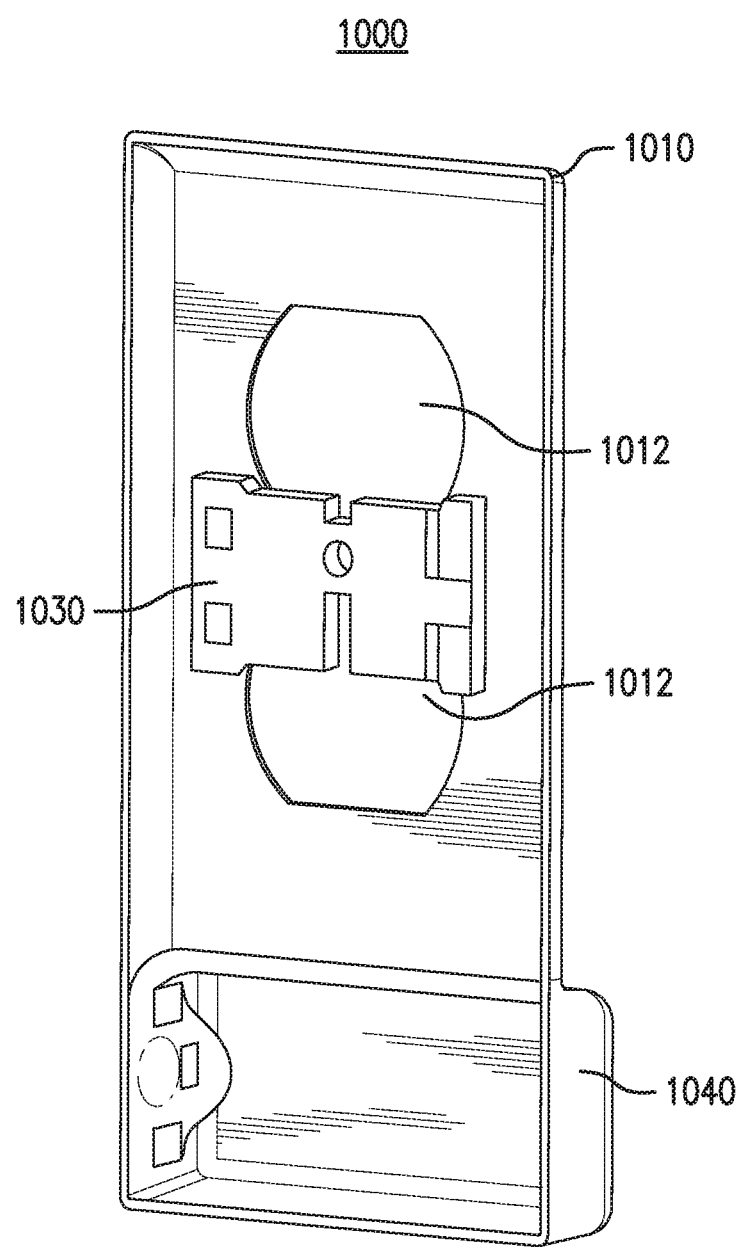
FIG. 11 shows a rear perspective view of an electrical panel used with an embodiment of the temperature sensing apparatus of the present invention.

Referring to FIGS. 10-11, a front view (FIG. 10) and rear view (FIG. 11), of an electrical panel apparatus 1000 is provided for.

In a preferred embodiment, the apparatus 1000 includes a wall plate 1010 inside which an electrical outlet can be mounted. The wall plate 1010 includes at least one opening 1012 for housing one or more electrical outlets.

The wall plate 1010 includes at least one hole 1070 into which a screw can be inserted, and further includes a base portion 1040. The base 1040 of the apparatus 1000 includes openings 1055 and 1060 for at least one speaker and at least one LED.

The wall plate 1010 further includes at least one contact plate 1030 extending across the rear side of the wall plate 1010 that is able to be folded over. Each apparatus will have its own wireless capability to send out and receive messages from the application. The invention will also have the ability to have the ability to send messages to the application and an alarm company. In a preferred embodiment, the software application will be setup so that each individual has his/her own login name and password to coincide with each apparatus owned by the individual. The application will allow users to assign each invention with a picture of what is plugged into the invention. Within the application, there will be pictures already saved of many different types of appliances that people may own for the consumers to browse through.

The application will have the ability to operate an apparatus such that it can toggle the power of each invention in the home or business by clicking on the picture that is designated for each invention. For example, if an individual left his/her home and forgot that his/her flat iron was on, rather than going all the way home to turn it off, he/she would just click on the designated picture that they had chosen, and turn off the power to the flat iron. This capability also applies to turning on an appliance. If a consumer wanted to turn on his/her lights before getting home, he/she would be able to do so by clicking on the designated picture that was saved for the light.

When the invention detects any type of heat outside of the normal range, the invention will send a message to the application to warn the owner that there is problem. The warning notification may optionally contain information as to which invention is affected by. This may be done by showing a picture that was associated with that particular apparatus, or by some other moniker. The application will also say the type of alarm that it detected. For example, the alarm could alert a user that head was detected from the outlet that the invention is plugged into, the heat generated from a faulty appliance that is overheating, that smoke has been detected, or that carbon monoxide has been detected. In addition to the notification sent to the mobile device, the application will also notify an alarm company of the problem found through the invention so that the fire department will be able to respond quickly and accordingly.

In a preferred embodiment, when the apparatus detaches from the wall or stays attached to the wall, an alarm will sound. The alarm may be a beeping noise and may optionally use words that state the location of the outlet, and the nature of the problem. To do this, the apparatus of the present invention will be equipped with a speaker built into it. The speakers will continue to operate through use of the power stored in the included battery of the apparatus. The audible notifications have the additional benefit of immediately notifying the homeowner that there may be a problem.

It is noted that, according to several embodiments of the present invention, the various apparatuses 100, 600, 800, 1000 work on 15-amp, 20-amp, and 120-volt circuit receptacles. According to several embodiments, the apparatuses 100, 600, 800, 1000 work on GFCI, AFCI, Tamper-resistant receptacle, and 1-10 gang duplex outlets.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the disclosure refers to exemplary embodiments, it will be understood by those skilled in the art that various changes may be made and equivalents may be substituted for elements thereof without departing from the scope of the disclosure. In addition, many modifications will be appreciated by those skilled in the art to adapt a particular instrument, situation or material to the teachings of the disclosure without departing from the spirit thereof. Therefore, it is intended that the disclosure not be limited to the particular embodiments disclosed.

What is claimed is:

1. An outlet cover for sensing temperature to prevent electrical fires, comprising:
   a faceplate configured for positioning against an outlet receptacle, the faceplate defining at least one hole configured to enable access to at least one socket of the outlet receptacle;
   a contact plate extending from the faceplate towards the outlet receptacle, the contact plate including a heat sensor configured to contact a terminal screw of the outlet receptacle and sense a temperature of the terminal screw of the outlet receptacle;
   at least one mounting screw inserted through the faceplate and affixed to the outlet receptacle to thereby affix the faceplate in position against the outlet receptacle; and
   a base extending from the faceplate and defining an enclosed shell, the enclosed shell including electronics configured to receive the sensed temperature of the terminal screw of the outlet receptacle from the heat sensor, determine whether the sensed temperature is above a temperature limit, and at least one of provide an output or break an electrical connection when it is determined that the sensed temperature is above the temperature limit.

2. The outlet cover according to claim 1, wherein the contact plate is flexible.

3. The outlet cover according to claim 1, further comprising electrical wires interconnecting the electronics with the contact plate.

4. The outlet cover according to claim 3, wherein the contact plate is further configured to extract electrical power from the outlet receptacle via the terminal screw, and wherein the electrical power is transmitted to the electronics via the electrical wires to power the electronics.

5. The outlet cover according to claim 4, wherein the electronics are configured to be powered by approximately 120-volt to 250-volt circuits at 15 amp, 20 amp, 30 amp, or 50 amps.

6. The outlet cover according to claim 1, wherein the electronics include a speaker and wherein the output provided when it is determined that the sensed temperature is above the temperature limit is an audible output from the speaker.

7. The outlet cover according to claim 1, wherein the electronics include a light emitting diode and wherein the output provided when it is determined that the sensed temperature is above the temperature limit is a visual output from the light emitting diode.

8. The outlet cover according to claim 1, wherein breaking the electrical connection includes tripping a circuit breaker or tripping a fuse.

9. The outlet cover according to claim 1, wherein the enclosed shell includes a battery holder and wherein the electronics include a battery disposed within the battery holder, the battery configured to power the outlet cover.

10. The outlet cover according to claim 1, wherein the enclosed shell includes a battery holder and wherein the electronics include a battery disposed within the battery holder, wherein the contact plate is configured to extract electrical power from the outlet receptacle via the terminal screw, and wherein at least one of:
   the batter is rechargeable and at least some of the electrical power is utilized to recharge the battery; or
   the battery is configured to operate as a backup power source for when the electrical power from the outlet receptacle is interrupted.

11. The outlet cover according to claim 1, wherein the contact plate is configured to extract electrical power from the outlet receptacle via the terminal screw to power the electronics.

12. The outlet cover according to claim 1, wherein the electronics include a printed circuit board assembly.

13. The outlet cover according to claim 1, wherein the electronics include a wireless transceiver.

14. The outlet cover according to claim 13, wherein the wireless transceiver includes software configured to render an image of a device plugged into the outlet receptacle.

15. The outlet cover according to claim 13, wherein the output provided when it is determined that the sensed temperature is above the temperature limit is a notification to an electronic device output from the wireless transceiver.

16. The outlet cover according to claim 1, wherein the temperature limit is between approximately 60 and 90 degrees Celsius.

17. The outlet cover according to claim 1, further comprising at least one insulating arm configured to hold the contact plate in place.

18. The outlet cover according to claim 1, wherein the outlet receptacle is selected from the group consisting of:
   a duplex outlet receptacle;
   a decora-style outlet receptacle;
   a ground-fault circuit interrupter outlet receptacle;
   a tamper resistant outlet receptacle;
   a back wire outlet receptacle;
   a heavy duty outlet receptacle;
   a commercial outlet receptacle
   a combination outlet receptacle;
   an arc fault circuit interrupter outlet receptacle;
   a weather resistant outlet receptacle;
   a rotating outlet receptacle;
   a split circuit outlet receptacle; and
   an ungrounded outlet receptacle.

19. An outlet cover for sensing temperature to prevent electrical fires, comprising:
   a faceplate configured for positioning against an outlet receptacle, the faceplate defining at least one hole configured to enable access to at least one socket of the outlet receptacle;
   a contact plate extending from the faceplate towards the outlet receptacle, the contact plate configured to contact a terminal screw of the outlet receptacle and including a heat sensor configured to sense a temperature of the terminal screw of the outlet receptacle;
   at least one mounting screw inserted through the faceplate and affixed to the outlet receptacle to thereby affix the faceplate in position against the outlet receptacle; and
   a base extending from the faceplate and defining an enclosed shell, the enclosed shell including electronics configured to receive the sensed temperature of the terminal screw of the outlet receptacle from the heat sensor and determine whether the sensed temperature is above a temperature limit, the electronics including a wireless transceiver configured to output a notification to an electronic device when it is determined that the sensed temperature is above the temperature limit, the notification identifying a device plugged into the outlet receptacle.

20. The outlet cover according to claim 19, wherein the notification identifies the device plugged into the outlet receptacle by providing an image of the device plugged into the outlet receptacle.

21. The outlet cover according to claim 20, wherein the image of the device plugged into the outlet receptacle is a picture of the device plugged into the outlet receptacle.

* * * * *